Patented Jan. 28, 1947

2,415,020

UNITED STATES PATENT OFFICE 2,415,020

INSECTICIDAL COMPOSITIONS

Glen H. Morey, Terre Haute, Ind., assignor to Commercial Solvents Corporation, Terre Haute, Ind., a corporation of Maryland No Drawing. Application April 5, 1944,
Serial No. 529,667

10 Claims. (Cl. 167—22)

My invention relates to insecticidal compositions suitable for use in sprays adapted for combating flies, mosquitoes and other common agricultural insect pests. More particularly, it is concerned with the use of certain bisdialkylaminobutenes as active contact insecticidal agents therein.

Extracts of materials such as pyrethrum flowers, derris, cube, timbo, barbasco, and the like, have previously been widely used for the control of insect pests. These toxicants are generally used as constituents of dusting mixtures, petroleum distillate sprays, or in the form of aqueous suspensions. Pyrethrum - containing compositions have a rapid paralyzing action on flies and other insects, but give a relatively low kill as compared to the per cent knocked down. With rotenone, a high kill is generally obtained although a considerable period of time is required to destroy the insects. The plant extracts are generally unstable and lose their activity to a considerable degree upon standing for any period of time. Also, there has been a number of synthetic preparations proposed for use as contact insecticides. However, the majority of such compounds that possess the greatest effectiveness have a highly objectionable odor, and hence, are not entirely satisfactory for household or other uses.

I have now discovered a group of compounds capable of functioning as contact insecticides, certain of which gives an average kill of 85 per cent and above, and which are free from the foregoing objectionable characteristics. Specifically, these compounds are bisdialkylaminobutenes in which the alkyl radicals contained therein have from three to six carbon atoms. In this connection it may be mentioned that the bisdialkylaminobutenes having less than three carbon atoms in the alkyl groups are of no value as insecticides. Examples of such compounds are 1,4-bisdipropyl-amino-2-butene, 1,4-bisdibutylamino - 2 - butene, 1,4-bisdiisoamyl-2-butene, 3,4 - bisdibutylamino-1-butene, 1,4-bisdihexylamino-2-butene, and the like.

The above described compounds can be represented by the general formula:

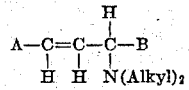

wherein both A and B represent substituents selected from a class consisting of H and $-CH_2 N(Alkyl)_2$, these substituents being so chosen that one of A and B represent H while the other represents $-CH_2 N(Alkyl)_2$, and the alkyl groups contain from 3 to 6 carbon atoms.

Compounds of the above type may be readily prepared by reacting a 1,4-dihalo-2-butene or a 3,4-dihalo-1-butene with a suitable secondary alkyl amine. In effecting this reaction, I prefer to employ approximately six moles of secondary amine for each mole of dihalobutene used. By employing these proportions, there is sufficient excess secondary amine present to serve as a solvent for the reaction. The reaction is preferably begun at room temperature. However, the heat thus generated ordinarily elevates the reaction temperature to between 70 and 80° C. When the reaction appears to be complete, an aqueous solution of sodium hydroxide is added to the mixture in order to liberate the secondary amine from the hydrogen halide with which it has combined during the course of the reaction. As a result of the addition of the aforesaid aqueous sodium hydroxide solution, two liquid layers are formed, the lower layer consisting chiefly of water and sodium chloride and the upper layer consists principally of the desired bisdialkylaminobutene together with the excess secondary amine. The two layers are separated and the upper layer containing the crude bisdialkylaminobutene is fractionated under reduced pressure and the purified product recovered.

The exact quantity of bisdialkylaminobutene utilized will be found to vary rather widely and to a certain extent depends upon the particular bisdialkylaminobutene concerned, the type of composition in which such insecticide is being employed, and the nature of the insect pests to be controlled. Generally speaking, however, a concentration of from about 4 to 7 per cent based upon the total weight of the finished insecticidal composition will be found sufficient. Any of the common vehicles employed in insecticide sprays, such as kerosene, "Ultrasene," or other like petroleum distillates, may be used in preparing the insecticidal compositions of my invention.

The effectiveness of the insecticidal compositions of my invention was determined in accordance with a modification of the standard Peet Grady test. This procedure for testing insecticidal compositions is described in the 1940 "Blue Book" published by the publisher of "Soap & Sanitary Chemicals" periodical on pages 193 to 197. In actual practice, this type of test consists of releasing from 100 to 150 housefly adults (five day old houseflies were used in the present tests) in an air-conditioned cage, 6' x 6' x 6', and spraying them with 6 ml. of insecticide. After ten minutes exposure, the number of flies incapacitated or knocked down is noted and all flies are then transferred to a cage and allowed to recuperate in fresh air for 24 hours, at which time the dead flies are counted. In carrying out these tests, the bisdialkylaminobutenes were mixed with kerosene in concentrations ranging from 4 to 7 per cent and compared with an official test insecticide, (O. T. I.) containing 5 per cent pyrethrum extract in kerosene. The table which follows shows the results obtained by testing these various sprays in the manner generally described above. The average per cent kill shown below is based upon from ten to one hundred ten individual tests.

Table

| Bisdialkylaminobutene | Concentration, percent | Average percent kill | Average O. T. I. percent kill |
|---|---|---|---|
| 1,4-bisdipropylamino-2-butene | 5 | 27.5 | 71.1 |
| 3,4-bisdibutylamino-1-butene | 4 | 69.9 | 58.8 |
|  | 5 | 78.8 | 59.1 |
| 1,4-bisdibutylamino-2-butene | 6 | 89.7 | 65.5 |
|  | 6 | 81.4 | 61.0 |

In view of the data appearing in the above table, it can be seen that the bisdialkylaminobutenes possess marked insecticidal activity. It will also be apparent that such compounds in addition to being useful by themselves in insecticide sprays constitute a valuable adjunct to toxicants which have previously been employed for similar purposes. Thus, the bisdialkylaminobutenes of my invention may be utilized in conjunction with materials, such as pyrethrum, rotenone, derris extract, nicotine, organic thiocyanates, and the like.

The insecticidal compositions of my invention may be applied in a number of different ways. For use as household insecticides, the bisdialkylaminobutenes may be dissolved in kerosene or similar petroleum distillates with or without the addition of other toxicants and sprayed. For use on plants, the bisdialkylaminobutenes may be dissolved in various plant spraying oils and emulsified in water to produce sprayable emulsions. Any of the common emulsifying agents utilized for such purposes can be employed in conjunction with these insecticidal compositions. In like manner, the bisdialkylaminobutenes themselves without the addition of a vehicle may be emulsified and used as plant spray insecticides.

While my invention has been described with particular reference to three specific bisdialkylaminobutenes, it is to be understood that it is not limited thereto, but on the contrary, is to be construed broadly and restricted solely to the scope of the claims that follow.

Now having described my invention, what I claim is:

1. An insecticidal composition comprising a bisdialkylaminobutene, selected from the group consisting of 1,4-bisdialkylamino-2-butenes and 3,4-bisdialkylamino-1-butenes, in which the alkyl groups present therein contain from three to six carbon atoms, and a carrier therefor.

2. An insecticidal composition adapted for use as a contact insecticide comprising 1,4-bisdibutylamino-2-butene, and a carrier therefor.

3. An insecticidal composition adapted for use as a contact insecticide comprising 3,4-bisdibutylamino-1-butene, and a carrier therefor.

4. An insecticidal composition adapted for use as a contact insecticide comprising 1,4-bisdipropylamino-2-butene, and a carrier therefor.

5. An insecticidal composition comprising a bisdialkylaminobutene, selected from the group consisting of 1,4-bisdialkylamino-2-butenes and 3,4-bisdialkylamino-1-butenes, in which the alkyl groups present therein contain from three to five carbon atoms, and a carrier therefor.

6. The composition of claim 1 where the carrier is a petroleum distillate.

7. The composition of claim 1 where the carrier is kerosene.

8. The composition of claim 1 where the carrier is an oil-water emulsion.

9. A contact insecticide comprising a carrier admixed with toxic concentrations of bisdialkylaminobutene having the general formula:

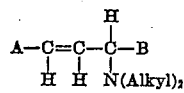

wherein both A and B represent substituents selected from a group consisting of H and

these substituents being so chosen that one of A and B represents H while the other represents —CH$_2$.N(Alkyl)$_2$, and the alkyl groups contain from 3 to 6 carbon atoms.

10. An insecticidal composition comprising a carrier liquid and from about 4 to 7% by weight of bisdialkylaminobutene, selected from the group consisting of 1,4-bisdialkylamino-2-butenes and 3,4-bisdialkylamino-1-butenes in which the alkyl groups present therein contain from three to six carbon atoms.

GLEN H. MOREY.